(12) United States Patent
Magi

(10) Patent No.: US 9,729,944 B2
(45) Date of Patent: Aug. 8, 2017

(54) INTERCHANGABLE CHARM MESSAGING WEARABLE ELECTRONIC DEVICE FOR WIRELESS COMMUNICATION

(71) Applicant: Intel Corporation, Santa Clara, CA (US)

(72) Inventor: Aleksander Magi, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 14/142,707

(22) Filed: Dec. 27, 2013

(65) Prior Publication Data
US 2015/0189403 A1    Jul. 2, 2015

(51) Int. Cl.
G08C 19/22    (2006.01)
H04Q 9/00    (2006.01)

(52) U.S. Cl.
CPC .................................. H04Q 9/00 (2013.01)

(58) Field of Classification Search
CPC ....................................................... H04Q 9/00
USPC ...................................... 340/870.01, 870.07
See application file for complete search history.

(56) References Cited

U.S. PATENT DOCUMENTS

| | | |
|---|---|---|
| 250,378 A | 12/1881 | Meyer |
| 274,350 A | 3/1883 | Luther |
| 3,023,422 A | 3/1962 | Shular |
| D287,108 S | 12/1986 | Levene |
| D420,539 S | 2/2000 | Tedesco |
| D421,727 S | 3/2000 | Pierson et al. |
| D446,146 S | 8/2001 | Cevallos |
| D452,456 S | 12/2001 | Cabarbaye |
| D472,840 S | 4/2003 | Visick |
| D501,652 S | 2/2005 | Pierson et al. |
| D516,449 S | 3/2006 | Charles |
| D537,480 S | 2/2007 | Sullivan |

(Continued)

FOREIGN PATENT DOCUMENTS

| | | |
|---|---|---|
| CN | 103018923 | 4/2013 |
| EP | 2368455 | 9/2011 |

(Continued)

OTHER PUBLICATIONS

PCT International Serach Report and Written Opinion in PCT International Application Serial No. PCT/US2014/067794 mailed on Mar. 16, 2015.

(Continued)

Primary Examiner — Amine Benlagsir
(74) Attorney, Agent, or Firm — Patent Capital Group

(57) ABSTRACT

Particular embodiments described herein provide for a wearable electronic device, such as a bracelet, coupled to a plurality of electronic components (which may include any type of components, elements, circuitry, etc.). One particular implementation of a wearable electronic device may include a bracelet portion, and at least one charm device configured to be affixed to the bracelet portion. The at least one charm device includes logic configured to receive a first interaction input, and send a first message including a first information indicative of the first interaction input and a first identifier associated with the at least one charm device to a second wearable electronic device. The first identifier is further associated at least a portion of the second wearable electronic device.

20 Claims, 8 Drawing Sheets

(56) References Cited

U.S. PATENT DOCUMENTS

| | | |
|---|---|---|
| D570,688 S | 6/2008 | Haywood |
| D606,595 S | 12/2009 | Levy |
| D631,773 S | 2/2011 | Parvex |
| D640,155 S | 6/2011 | Parvex |
| D658,089 S | 4/2012 | Rafaelian |
| D689,828 S | 9/2013 | Pierson |
| D690,667 S | 10/2013 | Pfeiler |
| D691,969 S | 10/2013 | Chu |
| D692,340 S | 10/2013 | Mejia |
| D703,087 S | 4/2014 | Fiasconaro |
| D705,111 S | 5/2014 | Namazy |
| D708,088 S | 7/2014 | DeCristofaro |
| D717,684 S | 11/2014 | Delaney |
| D729,101 S | 5/2015 | Rafaelian |
| 2004/0003133 A1* | 1/2004 | Pradhan et al. ............... 709/318 |
| 2009/0197749 A1 | 8/2009 | Merkel et al. |
| 2011/0157046 A1* | 6/2011 | Lee et al. ...................... 345/173 |
| 2012/0317024 A1* | 12/2012 | Rahman et al. ................. 705/42 |
| 2013/0127980 A1* | 5/2013 | Haddick et al. ........... 348/14.08 |
| 2013/0326790 A1* | 12/2013 | Cauwels et al. ................... 2/170 |
| 2013/0332353 A1 | 12/2013 | Aidasani et al. |
| 2014/0101896 A1 | 4/2014 | Rowton |

FOREIGN PATENT DOCUMENTS

| | | |
|---|---|---|
| TW | M297139 | 9/2006 |
| WO | WO 2015/099954 | 7/2015 |

OTHER PUBLICATIONS

U.S. Appl. No. 29/477,903, filed Dec. 28, 2013, entitled Wearable Computing Device, inventor Aleksander Magi.

This Next. House of Harlow 14KT Gold-Plated Blue Cabochon Stone Bangle. Nov. 20, 2009 [online]. [site viewed—Jun. 22, 2015]. Available from internet, <URL:http://www.thisnext.com/browse/blue-stone-bangle/>.

Polyvore. Danielle Stevens Jewelry Stone Bangles in Gold. Sep. 28, 2009 [online], [site visited Jun. 22, 2015]. Available from internet. <URL:http://www.polyvore.com/danielle_stevens_jewelry_stone_bangles/thing?id=63885536>.

USPTO Non Final Office Action in U.S. Appl. No. 29/477,903 mailed on Jul. 30, 2015.

International Preliminary Report on Patentability in PCT International Application Serial No. PCT/US2014/067794 mailed on Jun. 28, 2016.

Office Action for Taiwan (R.O.C.) Patent Application No. 103141009 mailed Jun. 28, 2016.

USPTO Final Office Action in U.S. Appl. No. 29/477,903 mailed on Dec. 1, 2015; 5 pages.

USPTO Notice of Allowance in U.S. Appl. No. 29/477,903 mailed on Mar. 11, 2016; 5 pages.

Official Letter and Search Report for Taiwan (R.O.C.) Patent Application No. 103141009 mailed Oct. 5, 2015 with English translation.

* cited by examiner

INTERCHANGABLE CHARM MESSAGING WEARABLE ELECTRONIC DEVICE FOR WIRELESS COMMUNICATION

TECHNICAL FIELD

Embodiments described herein generally relate to an interchangeable charm messaging wearable electronic device for wireless communication.

BACKGROUND

End users have more electronic device choices than ever before. A number of prominent technological trends are currently afoot (e.g., mobile electronic devices, smaller electronic devices, increased user connectivity, etc.), and these trends are changing the electronic device landscape. One of the technological trends currently afoot is electronic devices that can be worn by users, sometimes referred to as wearable electronic devices. Wearable electronic devices can be worn on a user's wrist, arm, ankle, etc. Electronic devices such as mobile phones provide features for typing and sending messages; however, this often requires the user to tediously type messages using a small interactive keyboard on the mobile phone. Although wearable electronic devices are quickly becoming a member of the technological ecosystem, interactions between device and user have yet to become streamlined and generally suffer from the same limitations as mobile phones for communicating messages.

BRIEF DESCRIPTION OF THE DRAWINGS

Embodiments are illustrated by way of example and not by way of limitation in the FIGURES of the accompanying drawings, in which like references indicate similar elements and in which.

Figure 1:
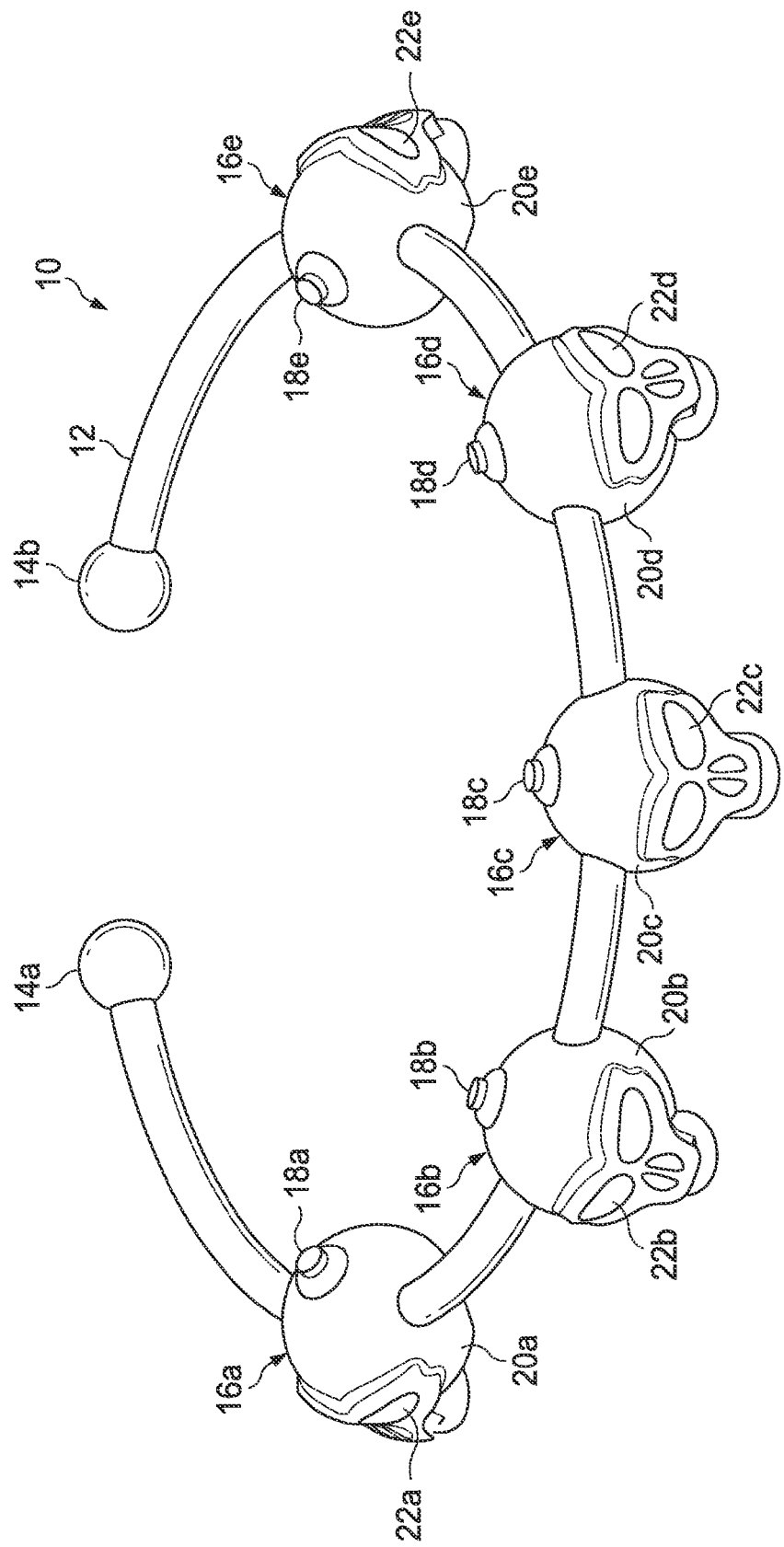
FIG. 1 is a simplified orthographic view illustrating an interchangeable charm messaging wearable electronic device for wireless communication in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

Particular embodiments described herein provide for a wearable electronic device, such as a bracelet, coupled to a plurality of electronic components (which may include any type of components, elements, circuitry, etc.). One particular implementation of a wearable electronic device may include a bracelet portion, and at least one charm device configured to be affixed to the bracelet portion. The at least one charm device includes logic configured to receive a first interaction input, and send a first message including a first information indicative of the first interaction input and a first identifier associated with the at least one charm device to a second wearable electronic device. The first identifier is further associated at least a portion of the second wearable electronic device.

In at least one embodiment, the wearable electronic device includes a touch input device configured to receive the first interaction input. In another embodiment, the second wearable electronic device is configured to provide a first sensory output indicative of the first interaction input. In still another particular embodiment, the first sensory output includes at least one of an illumination output, a vibration output, and an audio output. In another embodiment, the at least one charm device is associated with a user.

In another embodiment, the logic is further configured to receive a second message including a second information indicative of a second interaction input provided to at least a portion of the second wearable electronic device, and a second identifier associated with the second wearable electronic device. In still another embodiment, the wearable electronic device further includes at least one sensory output device, wherein the at least one sensory output device is configured to provide a second sensory output indicative of the second interaction input. In still another embodiment, the at least one sensory output device includes at least one of an illumination device, a vibration device, and an audio output device.

In another embodiment, the at least one charm device includes a position sensor configured to detect a position of the at least one charm device along the bracelet portion. In still another embodiment, the detected position of the at least one charm device along the bracelet portion determines a characteristic of the second sensory output.

In another embodiment, the bracelet portion includes at least one shape memory alloy (SMA) wire. In still another embodiment, the bracelet portion includes at least one magnetic stay configured to facilitate attachment of the at least one charm device to the bracelet portion. In another embodiment, at least a portion of the logic is partially implemented in hardware. In still another embodiment, the logic further includes at least one processor and at least one memory.

A particular implementation of at least one computer readable storage medium includes instructions, wherein the instructions when executed by at least one processor cause the at least one processor to receive, by at least one charm device configured to be affixed to a bracelet portion of a wearable electronic device, a first interaction input, and sending, by the at least one charm device, a first message including a first information indicative of the first interaction input and a first identifier associated with the at least one charm device to a second wearable electronic device. The first identifier is further associated with at least a portion of the second wearable electronic device.

Another particular implementation of a wearable electronic device includes a bracelet portion, at least one charm device configured to be affixed to the bracelet portion, and control logic. The control logic is configured to receive a first interaction input to the at least one charm device, and send a first message including a first information indicative of the first interaction input and a first identifier associated with the at least one charm device to a second wearable electronic device. The first identifier is further associated with at least a portion of the second wearable device.

Example Embodiments

The following detailed description sets forth example embodiments of apparatuses, methods, and systems relating to configurations for an interchangeable charm messaging wearable electronic device. Features such as structure(s), function(s), and/or characteristic(s), for example, are described with reference to one embodiment as a matter of convenience; various embodiments may be implemented with any suitable one or more of the described features.

FIG. 1 is a simplified orthographic view illustrating an interchangeable charm messaging wearable electronic device 10 for wireless communication in accordance with one embodiment of the present disclosure. Wearable electronic device 10 can include a bracelet portion 12 having a first end 14a and a second end 14b configured to be worn around a wrist of a user, and one or more charm devices 16a-16e configured to be attached to bracelet portion 12. In the particular embodiment illustrated in FIG. 1, bracelet portion 12 is constructed in a generally ring shaped form with an open portion between first end 14a and second end 14b to facilitate placing of wearable electronic device 10 upon a wrist of a user. In still other embodiments, bracelet portion 12 may be constructed as a closed ring having a clasp to facilitate placing wearable electronic device 10 upon the user's wrist. In various embodiments, bracelet portion 12 may be constructed of any suitable material such as metal, plastic, wood, or any combination thereof.

First charm device 16a includes a first touch input device 18a disposed upon a first housing portion 20a. First touch input device 18a is configured to receive a touch input from the user to initiate one or more functions of wearable electronic device 10. In particular embodiments, first touch input device 18a may include one or more of a button, a capacitive touch surface, a resistive touch surface, or any other suitable touch input device. First charm device 16a further includes one or more first illumination device(s) 22a disposed upon and/or within first housing portion 20a and configured to provide illumination as a visual feedback to the user. In particular embodiments, first illumination device(s) 22a may include one or more light-emitting diodes (LEDs), liquid crystal displays (LCDs), organic light-emitting diode displays (OLEDs), lamps or any other suitable illumination devices.

Similarly, second charm device 16b includes a second touch input device 18b disposed upon a second housing portion 20b, and one or more second illumination device(s) 22b disposed upon and/or within second housing portion 20b. Third charm device 16c includes a third touch input device 18c disposed upon a third housing portion 20c, and one or more third illumination device(s) 22c disposed upon and/or within third housing portion 20c. Fourth charm device 16d includes a fourth touch input device 18c disposed upon a fourth housing portion 20d, and one or more fourth illumination device(s) 22d disposed upon and/or within fourth housing portion 20d. Fifth charm device 16e includes a fifth touch input device 18e disposed upon a fifth housing portion 20e, and one or more fifth illumination device(s) 22e disposed upon and/or within fifth housing portion 20e.

In one or more embodiments, housing portions 20a-20e are constructed in one or more decorative shapes, such as a "smiley face", skull, hearts, various geometric shapes such as "a pyramid, cube, sphere, etc., or any other shape suitable or desirable to act as a charm of a charm bracelet. In particular embodiments, illumination devices 22a-22e may be configured to appear as "eyes" of the particular charm. In still other particular embodiments, one or more of housing portion 20a-20e may be of at least a partially transparent and/or translucent material and illumination devices 22a-22e may be disposed within housing portion 20a-20e such that illumination provided by illumination devices 22a-22e is visible through housing portion 20a-20e. The number of touch input devices illustrated in FIG. 1 are provided for illustrative purposes only; it should be understood that any number of fewer or more touch input devices can be configured for a wearable electronic device within the scope of the present disclosure.

In various embodiments, each of charm devices 16a-16e have an associated device identifier to identity the particular charm device 16a-16e from among a plurality of charm devices. In at least one embodiment, the device identifier is a unique identifier. In accordance with various embodiments, the identifier associated with a particular charm device 16a-16e may be further associated with a member of one or more groups (or "tribes") to which the user of wearable electronic device 10 also belongs. For example, each charm device 16a-16e may be associated with a family member, friend, member of a social group, and/or co-worker of the user of wearable electronic device 10.

Figure 2:
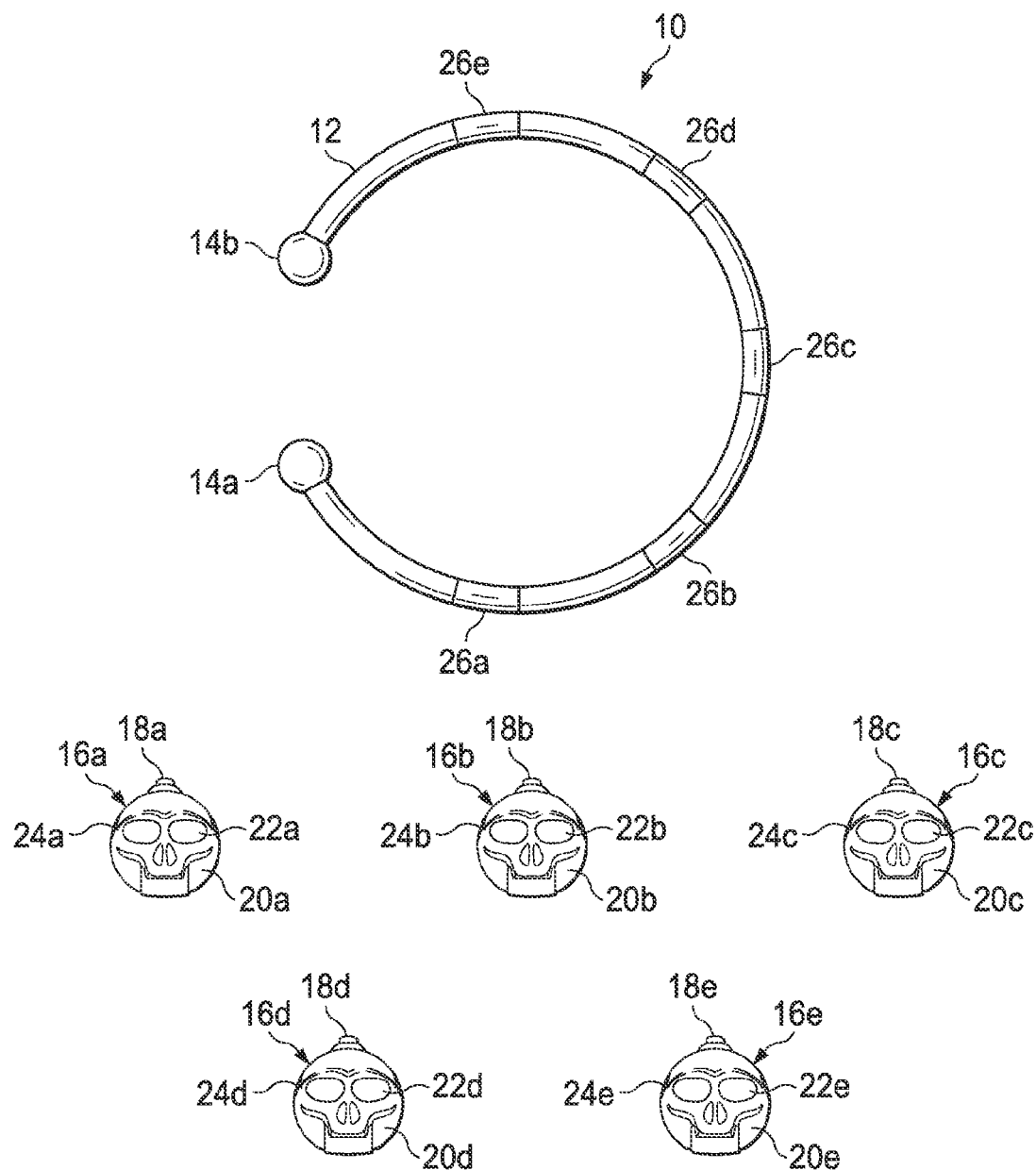
FIG. 2 is a simplified plan view illustrating the embodiment of the interchangeable charm messaging wearable electronic device of FIG. 1 in which charm devices are shown unattached to a bracelet portion.

FIG. 2 is a simplified plan view illustrating the embodiment of interchangeable charm messaging wearable electronic device 10 of FIG. 1 in which charm devices 16a-16e are shown unattached to bracelet portion 12. In the embodiment illustrated in FIG. 2, first charm device 16a includes a first aperture 24a extending through a portion of first housing portion 20a to allow a user to thread bracelet portion 12 through first aperture 24a to facilitate attachment of first charm device 16a to bracelet portion 12. Similarly, second charm device 16b includes a second aperture 24b extending through a portion of second housing portion 20b, third charm device 16c includes a third aperture 24c extending through a portion of third housing portion 20c, fourth charm device 16d includes a fourth aperture 24d extending through a portion of fourth housing portion 20d, and fifth charm device 16e includes a fifth aperture 24e extending through a portion of fifth housing portion 20e.

The embodiment illustrated in FIG. 2 further includes one or more magnetic stays 26a-26e disposed along an extent of bracelet portion 12, and each charm device 16a-16e may include magnetic material disposed within and/or upon a portion of first housing portion 20a to facilitate allowing the user to affix the particular charm device 16a-16e to a particular magnetic stay 26a-26e at a desired position along bracelet portion 12. Accordingly, a user may arrange charm devices 16a-16e in a desired order along bracelet portion 12.

Figure 3A:
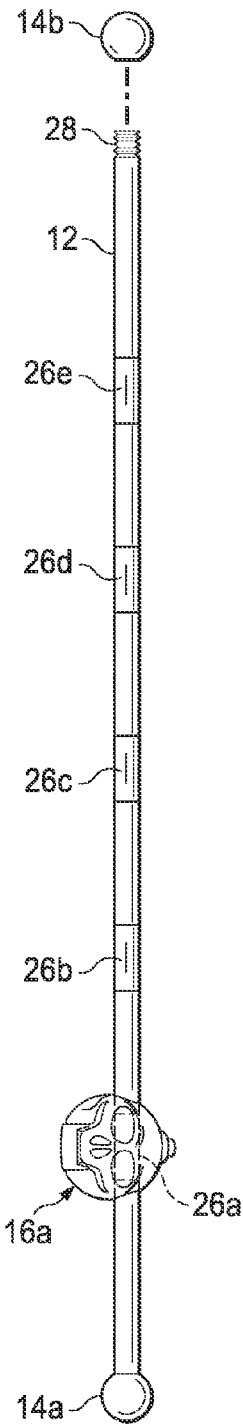
FIGS. 3A-3C illustrate an embodiment of a procedure for attaching the charm devices to the bracelet portion of the interchangeable charm messaging wearable electronic device of FIG. 1.
Figure 3B:
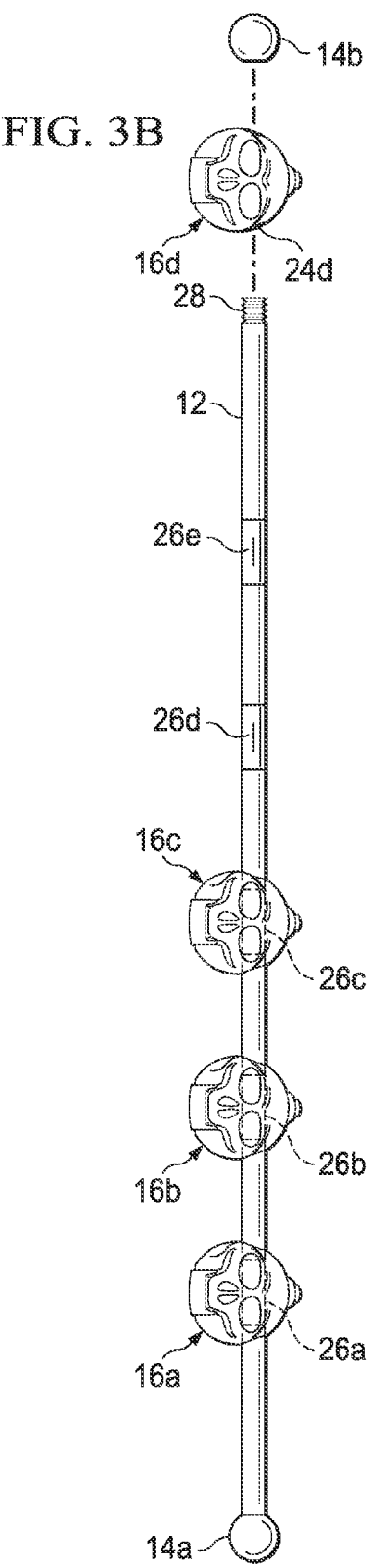
Figure 3C:
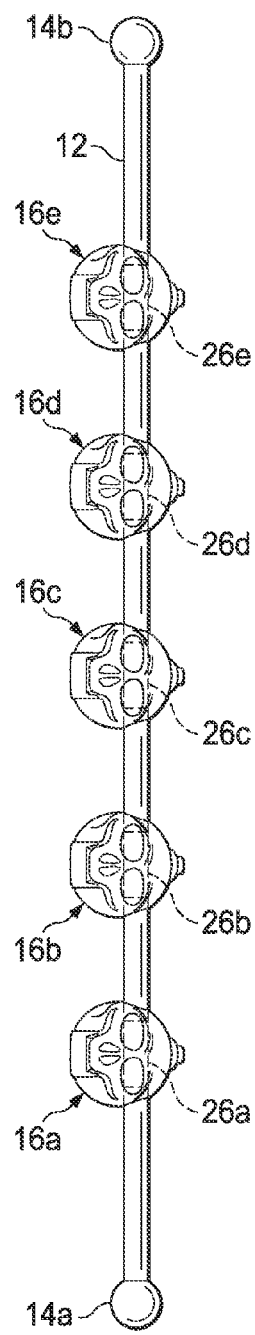

FIGS. 3A-3C illustrate an embodiment of a procedure for attaching charm devices 16a-16e to bracelet portion 12 of interchangeable charm messaging wearable electronic device 10 of FIG. 1. FIG. 3A illustrates first charm device 16a affixed to first magnetic stay 26a of bracelet portion 12. In the embodiment illustrated in FIG. 3A, bracelet portion 12 includes a threaded portion 28 at an end of bracelet portion 12 configured to allow second end portion 12b to be alternately unthreaded and threaded onto bracelet portion 12 to facilitate detachment and attachment of second end portion 14b. FIGS. 3A-3B illustrate second end portion 12b detached from threaded portion 28 to facilitate attachment of charm devices 16a-16e to bracelet portion 12. FIG. 3B illustrates further affixing of second charm device 16b to second magnetic stay 26b of bracelet portion 12, and third charm device 16c to third magnetic stay 26c of bracelet portion 12. FIG. 3B further illustrates a process of second end portion 14b of bracelet portion 12 being threaded through fourth aperture 24d of fourth charm device 16d in order to affix fourth charm device 16d to fourth magnetic stay 26d of bracelet portion 12. FIG. 3C illustrates fourth charm device 16d affixed to fourth magnetic stay 26d of bracelet portion 12, and fifth charm device 16e affix to fifth magnetic stay 26e of bracelet portion 12. In FIG. 3C, second end portion 12b is illustrated as threaded onto and attached to bracelet portion 12. The user may then affix wearable electronic device 10 to a wrist of the user if desired.

In accordance with various embodiments, a first user may utilize wearable electronic device 10 to communication with specific members of a group in which each charm device 16a-16e may signify a different member of the group. The first user may interact with one or more of charm devices 16a-16e via the corresponding touch input device 18a-18e to send an input such as pulse, pattern or other gesture of interaction to a certain one or more charm devices of a second wearable electronic device worn by a second user who is a member of the group to which the first user belongs. The one or more charm devices of the second wearable electronic device may provide a sensory indication such as a visual indication, audio indication, and/or vibration indication to the second user corresponding to the input of the first user. For example, in an example operation the first user may send a quick 1-1-1 pattern via third touch input device 18c of third charm device 16c to the second user who is a brother of the first user, and a charm device corresponding to the first user affixed to the second wearable electronic device of the second user may provide a sensory indication to the second user corresponding to the 1-1-1 pattern. The second user may then respond to the first user by sending a pattern back to first user by providing a touch input to the charm corresponding to the first user. In still another example operation, the first user may send an interaction to a multiple of users by providing a touch input to each of charm devices 16a-16e corresponding to the particular user.

In one or more embodiments, each of charm device 16a-16e may include a wireless module to facilitate communication of touch input message to other charm devices of either wearable electronic device 10 or charm devices of other wearable electronic devices associated with other users. In various embodiments, charm devices of a first wearable electronic device associated with a first user may communicate with a first wireless device associated with the first user, such as a first smartphone. First wireless device may communicate with a second wireless device associated with a second user via one or more wireless networks. The second wireless device may further communicate with one or more charm devices of a second wearable electronic device. In this manner, touch inputs between charm devices of different wearable electronic devices may be relayed. In still other embodiments, the charm devices of the first wearable electronic device may communicate with the charm devices of the second wearable electronic device directly without requiring use of the first wireless device or the second wireless device.

Although various embodiments described herein illustrate wearable electronic device 10 as including five charm devices 16a-16e, it should be understood that in other embodiments wearable electronic device 10 may be configured to accommodate more or less than five charm devices. For example, in particular embodiments wearable electronic device 10 may be configured to accommodate from three to ten charm devices with a corresponding number of magnetic stays disposed along bracelet portion 12.

Figure 4:
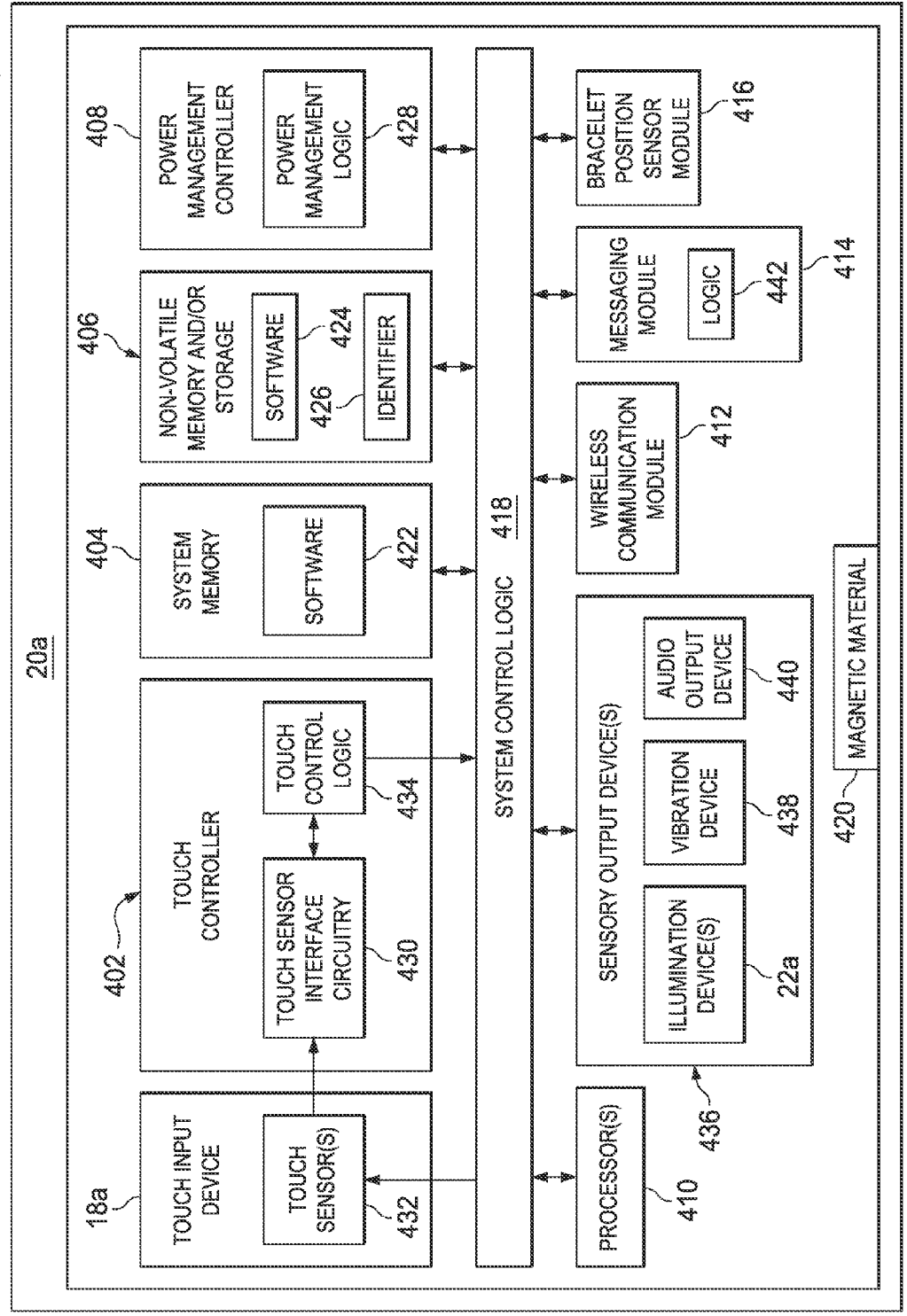
FIG. 4 is a simplified block diagram illustrating example logic that may be used to execute activities associated with the present disclosure.

FIG. 4 is a simplified block diagram illustrating example logic that may be used to execute activities associated with a charm device 16a of wearable electronic device 10 as discussed herein. In at least one example embodiment, charm device 16a can include a touch input device 18a, a touch controller 402, a system memory 404, a non-volatile memory and/or storage 406, a power management controller 408, processor(s) 410, sensory output devices 436, wireless communication module 412, messaging module 414, and a bracelet position sensor module 416, each of which is coupled to system control logic 418. In the embodiment illustrated in FIG. 4, touch input device 18a, touch controller 402, system memory 404, non-volatile memory and/or storage 406, power management controller 408, processor(s) 410, sensory output devices 436, wireless communication module 412, messaging module 414, bracelet position sensor module 416, and system control logic 418 are enclosed at least partially within first housing portion 20a of charm device 16a. Charm device 16a may further include magnetic material 420 disposed proximate to or attached to first housing portion 20a. Magnetic material 420 is configured to be magnetically attracted to one or more of magnetic stays 26a-26e to facilitate attachment of charm device 16a to a desired location on bracelet portion 12.

Hence, the basic building blocks of any wearable electronic device system (e.g., processor, controller, memory, I/O, display, etc.) can be used in conjunction with the teachings of the present disclosure. Certain components could be discrete or integrated into a System on Chip (SoC). Some general system implementations can include certain types of form factors in which charm device 16a is part of a more generalized enclosure. In alternate implementations, instead of wearable electronic devices, certain alternate embodiments deal with mobile phones, tablet devices, etc.

System control logic 418, in at least one embodiment, can include any suitable interface controllers to provide for any suitable interface to at least one processor 410 and/or to any suitable device or component in communication with system control logic 418. System control logic 418, in at least one embodiment, can include one or more memory controllers to provide an interface to system memory 404. System memory 404 may be used to load and store data and/or instructions, for example, for charm device 16a. System memory 404, in at least one embodiment, can include any suitable volatile memory, such as suitable dynamic random access memory (DRAM) for example. System memory 404 may store suitable software 422 and/or non-volatile memory and/or storage device(s).

Non-volatile memory and/or storage device(s) 406 may be used to store data and/or instructions, for example within software 424. Non-volatile memory and/or storage device(s) 406 may include any suitable non-volatile memory, such as flash memory for example, and/or may include any suitable non-volatile storage device(s), such as one or more hard disc drives (HDDs), solid state drives (SSDs), etc. for example.

In various embodiments, non-volatile memory and/or storage 406 includes a device identifier 426 associated with charm device 16a to uniquely identifier charm device 16a from among a plurality of charm devices.

Power management controller 408 may include power management logic 428 configured to control various power management and/or power saving functions. In at least one example embodiment, power management controller 428 is configured to reduce the power consumption of components or devices of charm device 16a that may either be operated at reduced power or turned off when the wearable electronic device is in an inactive state (e.g., not being accessed, etc.). For example, in at least one embodiment, when charm device 16a is in an inactive state, power management controller 428 may perform one or more of the following: power down the unused portion of touch input device 18a; allow one or more of processor(s) 410 to go to a lower power state if less computing power is required during times of inactivity; and shutdown any devices and/or components that may be unused when charm device 16a is in an inactive state. System control logic 418, in at least one embodiment, can include one or more I/O controllers to provide an interface to any suitable input/output device(s), for example, an audio device to help convert sound into corresponding digital signals and/or to help convert digital signals into corresponding sound, a camera and/or a video recorder.

For at least one embodiment, at least one processor 410 may be packaged together with logic for one or more controllers of system control logic 418. In at least one embodiment, at least one processor 410 may be packaged together with logic for one or more controllers of system control logic 418 to form a System in Package (SiP). In at least one embodiment, at least one processor 410 may be integrated on the same die with logic for one or more controllers of system control logic 418. For at least one embodiment, at least one processor 410 may be integrated on the same die with logic for one or more controllers of system control logic 418 to form a System on Chip (SoC). In one or more embodiments, processor 410 may include a general purpose processor, a limited purpose processor, an application specific processor, or any other suitable processing logic.

For touch input, touch controller 402 may include touch sensor interface circuitry 430 coupled to one or more touch sensor(s) 432 to detect touch input(s) from the user. Touch sensor interface circuitry 430 may include any suitable circuitry that may depend, for example, at least in part on the touch-sensitive technology used for touch input device 18a.

Further for touch control, touch control logic 434 may be coupled to touch sensor interface circuitry 430 to help control touch sensor interface circuitry 430 in any suitable manner to detect touch input from the user. For touch control, touch control logic 434 for at least one example embodiment may also be coupled to system control logic 418 to output in any suitable manner digital touch input data corresponding to one or more touch inputs detected by touch sensor interface circuitry 430. Touch control logic 434 may be implemented using any suitable logic, including any suitable hardware, firmware, and/or software logic (e.g., non-transitory tangible media), that may depend, for example, at least in part on the circuitry used for touch sensor interface circuitry 430.

For touch control, touch control logic 434 may be coupled to system control logic 418 to output digital touch input data to system control logic 418 and/or at least one processor 410 for processing. At least one processor 410 for at least one embodiment may execute any suitable software to process digital touch input data output from touch control logic 434. Suitable software may include, for example, any suitable driver software and/or any suitable application software.

Sensory output device(s) 436 may include one or more of illumination device(s) 22a, vibration device 438, and audio output device 440. In various embodiments, illumination device(s) 22a, vibration device 438, and audio output device 440 are configured to provide a visual indication, or vibration indication, and/or audio indication, respectively, to a first user of wearable electronic device 10a in response to charm device 16a receiving a signal initiated by a second user associated with charm device 16a. In particular embodiments, the signal is generated by the second user via another wireless device, such as second wearable electronic device, associated with the second user.

In one or more embodiments, wearable electronic device 10a can include wireless communication module 412 (e.g., Wi-Fi module, Bluetooth™ module, near field communication (NFC) module, or other wireless communication circuitry) to allow charm device 16a to communicate with one or more other electronic devices (wearable or not wearable) on a network through a wireless connection. The wireless connection may be any 3G/4G/LTE cellular wireless connection, WiFi/WiMAX connection, Bluetooth™ connection, or some other similar wireless connection. In one or more embodiments, the wireless communication circuitry can be configured to provide for two-way radio communications with another two-way radio capable device. In an embodiment, a plurality of antennas can be provisioned in conjunction with charm device 16a, which may be associated with wireless connection activities. The antennas are reflective of electrical components that can convert electric currents into radio waves or radio signals. Charm device 16a may include logic to determine a best mode of communication using various signal measurement techniques, including, but not limited to, wireless beacons (to locate one or more Wi-Fi networks), received signal strength indicator (RSSI), link quality indicator (LQI), measurement reports for one or more 3G/4G/LTE cellular wireless connections, combinations thereof or the like.

Charm device 16a may further include messaging module 414 including logic 442 configured to perform the various charm messaging functions described herein. In some embodiments, charm device 16a may further include bracelet position sensor module 416 configured to detect a current affixed position of charm device 16a on bracelet portion 12. In one or more embodiments, bracelet portion 12 may include a tag or other location device positioned proximate to each of magnetic stays 26a-26e and bracelet position sensor module 416 may detect the particular tag to determine the position of the charm device 16a along the bracelet portion 12. In a particular embodiment, the tag may include a radio-frequency identification (RFID) tag and bracelet position sensor module 416 may include an RFID sensor to detect the RFID tag when charm device 16a is positioned proximate to the RFID tag. In accordance with various embodiments, a position of a particular charm device along bracelet portion 12 and/or a relative position of the particular charm device with respect to other charm devices along bracelet portion 12 may determine a nature, characteristic and/or strength of the sensory output provided to the user by the particular charm device. Referring again to FIG. 1, in an example operation the position each of charm devices 16a-16e may determine hierarchical order of members associated with each of charm devices 16a-16e such that a signal received by charm device 16c may provide a stronger sensory output to the user, such as brighter illumination, a stronger vibration, or louder audio signal, than a signal received by charm device 16*a*.

In one or more embodiments, charm device 16*a* may be configured to operate using a replaceable battery, or in some cases, may be configured to operate using a rechargeable battery, each of which may be housed in housing portion 20*a*. In some embodiments, charm device 16*a* may include charging contacts configured on the outer surface of housing portion 20*a*, which can be used in combination with a charging device to facilitate charging a rechargeable battery within charm device 16*a*. Virtually any means may be used to provide power and/or charging for charm device 16*a*, and, thus, are clearly within the scope of the present disclosure.

For purposes of illustrating certain example features of electronic device 10*a* (and 10*b*, discussed below) the following foundational information may be viewed as a basis from which the present disclosure may be properly explained. Wearable electronic devices and electronic devices, such as mobile phones, often provide a means to communicate messages, but these means often involve a user to physically type a message into the device using a digital keyboard displayed on the device. Some devices may provide enhanced messaging input modes where a user may swipe letters together to form a word or message, but these input modes still require the user's attention to focus on a keyboard and connect letters to form a word or message. Some devices may also provide auto-complete features where a word or phrase may be completed after inputting a few letters of a word or a predetermined sequence of letters, but these input modes also require the user to concentrate on inputting letters on a keyboard. These problems are amplified in the case of wearable electronic devices, which typically have a smaller form factor than mobile phones and, thus, make inputting messages even more difficult, even under normal situations. In addition, existing electronic devices are explicit in the messages that they send to other devices. These direct messages may include for example, pictures, text, or email messages. Further, existing digital interactions between users are dependent upon a user's direct interaction with a user's main communication device, such as a mobile phone, to provide communication between users. Such messaging input modes can be burdensome when a user may active, for example, walking, running, playing sports or performing some other activity to which the user's attention may be focused.

Various embodiments provide for a charm bracelet or other wearable electronic device configured to allow a user to communicate with specific members of a group such as family, friends, social group members, and/or co-workers by interacting with the charms of the charm bracelet in which each charm signifies and is associated with a different member of the group. In certain embodiments, the user is able to interact with a specific charm upon to send a message such as pulse, pattern or other unique gesture to another use associated with the specific charm, or to interact with multiple charms to send messages to a number of different users associated with the charms. In one or more embodiments, the charm allows the user to send an abstract message to a user rather than an explicit message. For example, a user may send a quick pattern to his brother indicating the user is thinking of him at that moment. In another example, the user may interact with multiple charms to send a "warm glow" to his family to signify that he is providing "thought and energy" to the family. In accordance with various embodiments, a second user receiving such a message from the first user may use a charm bracelet or other wearable electronic device associated with the second user to send a response message to the charm associated with the second user attached to the charm bracelet of the first user.

Figure 5:
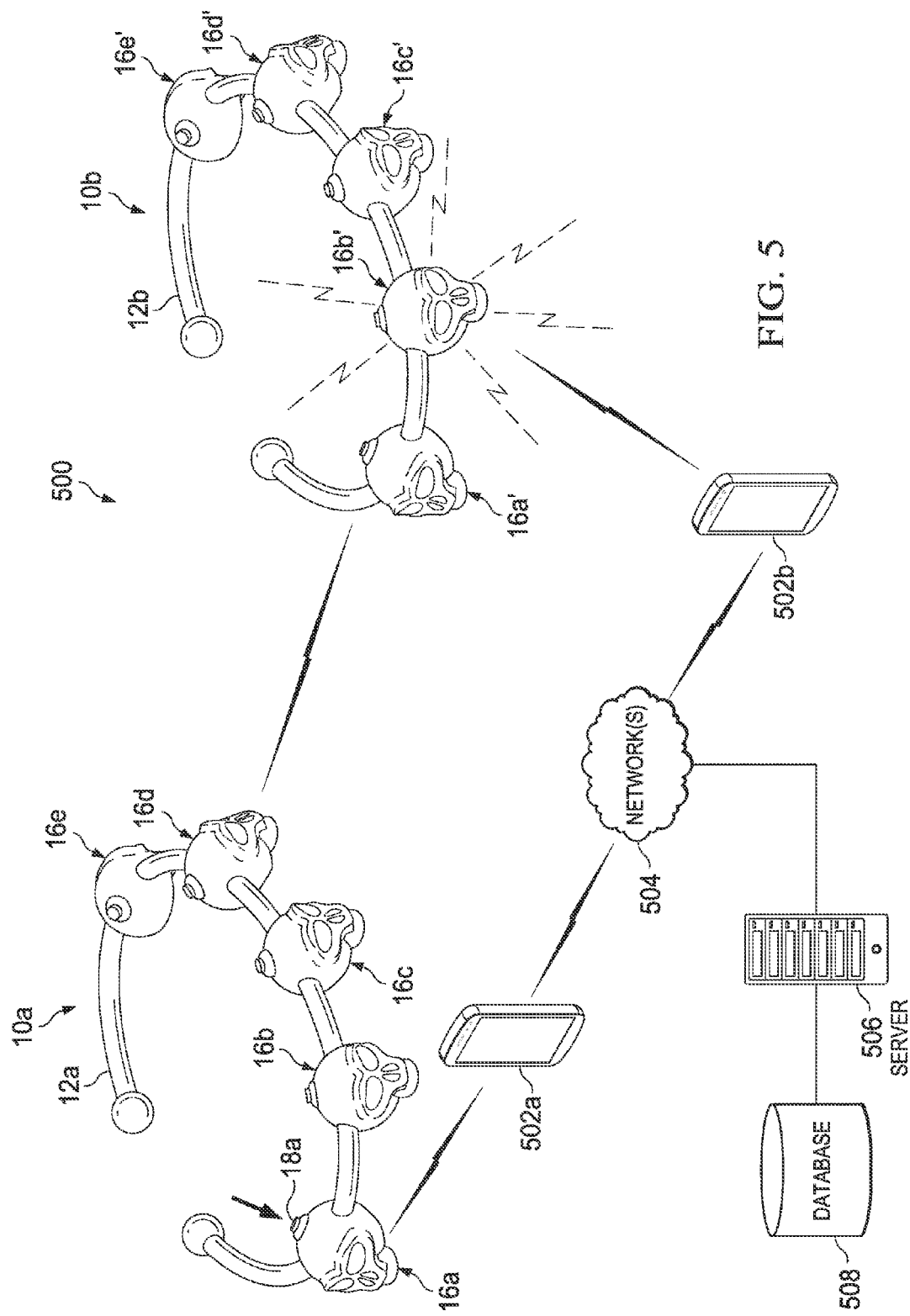
FIG. 5 is a simplified block diagram illustrating an embodiment of a communication system for wireless communication between interchangeable charm messaging wearable electronic devices.

Referring now to FIG. 5, FIG. 5 is a simplified block diagram illustrating an embodiment of a communication system 500 for wireless communication between interchangeable charm messaging wearable electronic devices. Communication system 500 includes a first wearable electronic device 10*a*, a first electronic communication device 502*a*, network(s) 504, a second wearable electronic device 10*b*, a second electronic communication device 502*b*, one or more networks 504, a server 506, and a database 508. In at least one embodiment, first wearable electronic device 10*a* is in communication with first electronic communication device 502*a* via a first wireless connection, and second wearable electronic device 10*b* is in communication with second electronic communication device 502*b* via a second connection. In at least one embodiment, first electronic communication device 502*a* is in communication with network(s) 504 via a third wireless connection, and second electronic communication device 50*b* is in communication with network(s) 504 via a fourth wireless connection. In particular embodiments, one or more of the first wireless connection, second wireless connection, third wireless connection, and fourth wireless connection may be any 3G/4G/LTE cellular wireless, WiFi/WiMAX connection, Bluetooth™ or some other similar wireless connection.

Network(s) 504 may be a series of points or nodes of interconnected communication paths for receiving and transmitting packets of information that propagate through network(s) 504. Network(s) 504 offers a communicative interface and may include any local area network (LAN), wireless local area network (WLAN), metropolitan area network (MAN), Intranet, Extranet, WAN, virtual private network (VPN), cellular network or any other appropriate architecture or system that facilitates communications in a network environment. Network(s) 504 can comprise any number of hardware or software elements coupled to (and in communication with) each other through a communications medium. First electronic communication device 502*a* and second communication device 502*b* may be a computer (e.g., notebook computer, laptop, tablet computer or device), a phablet, a cellphone, a personal digital assistant (PDA), a smartphone, a movie player of any type, router, access point, another wearable electronic device or other device that includes a circuit board coupled to a plurality of electronic components (which includes any type of components, elements, circuitry, etc.). In one or more embodiments, first wearable electronic device 10*a* and first electronic communication device 502*a* are associated with a first user, and second wearable electronic device 10*b* and second electronic communication device 502*b* are associated with a second user.

Server 506 is in communication with network(s) 504 and in further communication with database 508. In one or more embodiments, server 506 is configured to receive a message initiated by one or more of charm devices 16*a*-16*e* affixed to first bracelet portion 12*a* of wearable electronic device, determine one or more charm devices 16*a'*-16*e'* attached to second bracelet portion 12*b* of second wearable electronic device 10*b* to which the message should be directed, and relay the one or more message to one or more of charm devices 16*a'*-16*e'*. In one or more embodiments, database 508 may include a one or more records including a user identifier associated with the first user of first wearable electronic device 10*a* and one or more device identifiers associated with each of charm devices 16*a*-16*e*. Each of the device identifiers may be further associated with a user identifier associated with another user, such as the user associated with second wearable electronic device 10a.

An example database record for the first user of first wearable electronic device 10a is as follows:

User ID #1 (user)
Device ID #1 (charm device 16a) User ID #2
Device ID #2 (charm device 16b) User ID #3
Device ID #3 (charm device 16c) User ID #4
Device ID #4 (charm device 16d) User ID #5
Device ID #5 (charm device 16e) User ID #6

In the example database record, User ID #1 includes a first user identifier associated with the first user of first wearable electronic device 10a. In one or more embodiments, the first user identifier is the same as the user identifier used for first electronic communication device 502a. In a particular embodiment, User ID #1 is a mobile telephone number associated with first electronic communication device 502a. Device ID #1 is the device identifier associated with first charm device 16a, and User ID #2 is a second user identifier associated with the second user of second wearable electronic device 10a. In a particular embodiment, User ID #2 is a mobile telephone number associated with second electronic communication device 502b.

Similarly, Device ID #2 is the device identifier associated with second charm device 16b, and User ID #3 is an identifier associated with a third user of a third wearable electronic device (not shown). Device ID #3 is the device identifier associated with third charm device 16c, and User ID #4 is an identifier associated with a fourth user of a fourth wearable electronic device (not shown). Device ID #4 is the device identifier associated with fourth charm device 16d, and User ID #5 is an identifier associated with a fifth user of a fifth wearable electronic device (not shown). Device ID #5 is the device identifier associated with fifth charm device 16e, and User ID #6 is an identifier associated with a sixth user of a sixth wearable electronic device (not shown).

In accordance with various embodiments, the first user of first wearable electronic device 10a may initiate a registration process to register first charm device 16a with server 506 in which User ID#1, Device ID#1, and User ID #2 is provided to a software application associated with first electronic communication device 502a, and first electronic communication device 502a sends User ID#1, Device ID #1, and User ID #2 to server 506. Server 506 then stores Device ID #1 and User ID #2 in a database record associated with User ID #1. In a particular embodiment, first charm device 16a may send Device ID #1 to first electronic communication device 502a in response to the first user inputting a predetermined sequence using first touch input device 18a of first charm device 16a. In still other particular embodiments, the first user may provide User ID #2 to first electronic communication device 502a by the first user selecting a name associated with User ID #2 from a contact list and associating User ID #2 with Device ID #1 using a user interface provided by first electronic communication device 502a. The first user may perform a similar procedure to associate Device ID #2 with User ID #3, associate Device ID #3 with User ID #4, associate Device ID #4 with User ID #5, and associate Device ID #5 with User ID #6.

In accordance with various embodiments, the second user may associate each of charms 16a'-16e' attached to second bracelet portion 12b of second wearable electronic device 10b with other users. For example, the second user may associate the device identifier associated with charm device 16b' with the user identifier of first user (User ID #1) using a user interface of second electronic communication device 502b, and second electronic communication device 502b may send the User ID #2, the device identifier associated with charm device 16b' (Device ID #2'), and User ID #1 to server 506 via network(s) 504. Server 506 may then store User ID #1 and Device ID #2') in a database record associated with User ID #2.

In example operations associated with FIG. 5, the first user may interact with first charm device 16a of wearable electronic device 10a using first touch input device 18a. For example, the first user may input a predetermined sequence of touch inputs to first touch input device 18a. First charm device 16a may then send a first message including information indicative of the interaction input and including Device ID #1 to first electronic communication device 502a. First electronic device 502a then sends a second message including the interaction indication, Device ID #1, and User ID #1 to server 506. Server 506 then may determine that the second message is directed to User ID #2 by referencing the association between Device ID #1 and User ID #2 within database 508. Server 506 may then send a third message to second electronic communication device 502b including the interaction indication and Device Identifier #2' associated with charm device 16b'. Second electronic communication device 502b may then send a fourth message to charm device 16b' including Device Identifier #2 and the interaction indication to charm device 16b'. In response, charm device 16b' may provide sensory output to the second user indicative of the interaction indication. In a particular embodiment, charm device 16b' may provide one or more of an illumination, audio, and/or vibration output to the second user. In one or more embodiments, the sensory output provided to the second user may replicate at pattern or sequence inputted by the first user.

In accordance with various embodiments, the second user may send a response to the first user using charm device 16b', and a sensor output indicative of the response may be provided to the first user by first charm device 16a.

Although the embodiment of FIG. 5 is illustrated as using first electronic communication device 502a second electronic communication device 502b, server 506, and database 508, it should be understood that in other alternative embodiments one or more of first electronic communication device 502a second electronic communication device 502b, server 506, and database 508 may be omitted. In particular embodiments, one or more charm devices of first wearable electronic device 10a and one or more charm devices of second wearable electronic device 10b may communicate directly with one another without requiring the user of first electronic communication device 502a second electronic communication device 502b, server 506, and/or database 508.

In one or more embodiments, interactions between first wearable electronic device 10a and second wearable electronic device 10b may be performed locally using a peer to peer connection without requiring one or more of network(s) 405, server 506, and/or database 508. In a particular embodiment, the respective charm devices of first wearable electronic device 10a and second wearable electronic device 10b may communicate with one another via a wireless connection between first electronic communication device 502a and second electronic communication device 502b. In particular examples, first electronic communication device 502a and second electronic communication device 502b may communicate with one another via Wi-Fi, Bluetooth™, NFC or any other suitable wireless communication technology. In still another embodiment, the respective charm devices of first wearable electronic device 10a and second wearable electronic device 10b may directly communicate with one another via a wireless connection such as Wi-Fi, Bluetooth™, NFC or any other suitable wireless communication technology.

In a particular embodiment, the first user may store a device ID associated with a particular charm device 16a'-16e' located on second wearable electronic device 10b as a "known ID" using first electronic communication device 502a. When the particular charm device 16a'-16e' is determined to be proximate to first wearable electronic device 10a, one or more of charm devices 16a-16e of wearable electronic device 10a may provide a sensory output to the first user indicative that the second user is nearby.

In another embodiment, two or more specific charm devices 16a-16e being determined as located on first wearable electronic device 10a may cause a particular interaction result, such as a specific sensory output, to be provided to the user. In still another embodiment, two or more specific charm devices 16a-16e determined to be located in a specific placed order on the magnetic stays of bracelet portion 12a may cause a particular interaction result. In still another embodiment, one or more specific charm devices 16a-16e located on first wearable electronic device 10a may interact with one or more specific charm devices 16a'-16e' located on second wearable electronic device 10b may cause a particular interaction result such as by a given charm device being present, a combination of charm devices being present per wearable electronic device, and/or an order of charm devices being present per wearable electronic device. In still other embodiments, a hierarchical order of charm devices being present on a particular wearable electronic device, such as from a first end to a second end, a second end to a first end, or a middle charm device outward, may determine a particular interaction result.

In still another embodiment, interactions between charm devices on the same wearable electronic device and/or interactions between charm devices on different wearable electronic devices may be actively enabled and/or passively enabled. For example, interactions between charm devices may be actively enabled by a user interaction with one or more charm devices causing charm interaction to take place. In another example, interactions between charm devices may be passively enabled such that the charm devices of a wearable electronic device interact and cause sensory output results by the charm devices being on the same wearable electronic device at the same time and/or being within a specified range to charm devices of a second wearable electronic device. In a particular example, if one or more charm devices that are deemed to be incompatible with one another (such as a charm device that represents fire and a charm device that represents water) are placed upon the same wearable electronic device, one or more of the charm devices may be configured to provide an immediate sensory output indication representative of the incompatibility.

Figure 6:
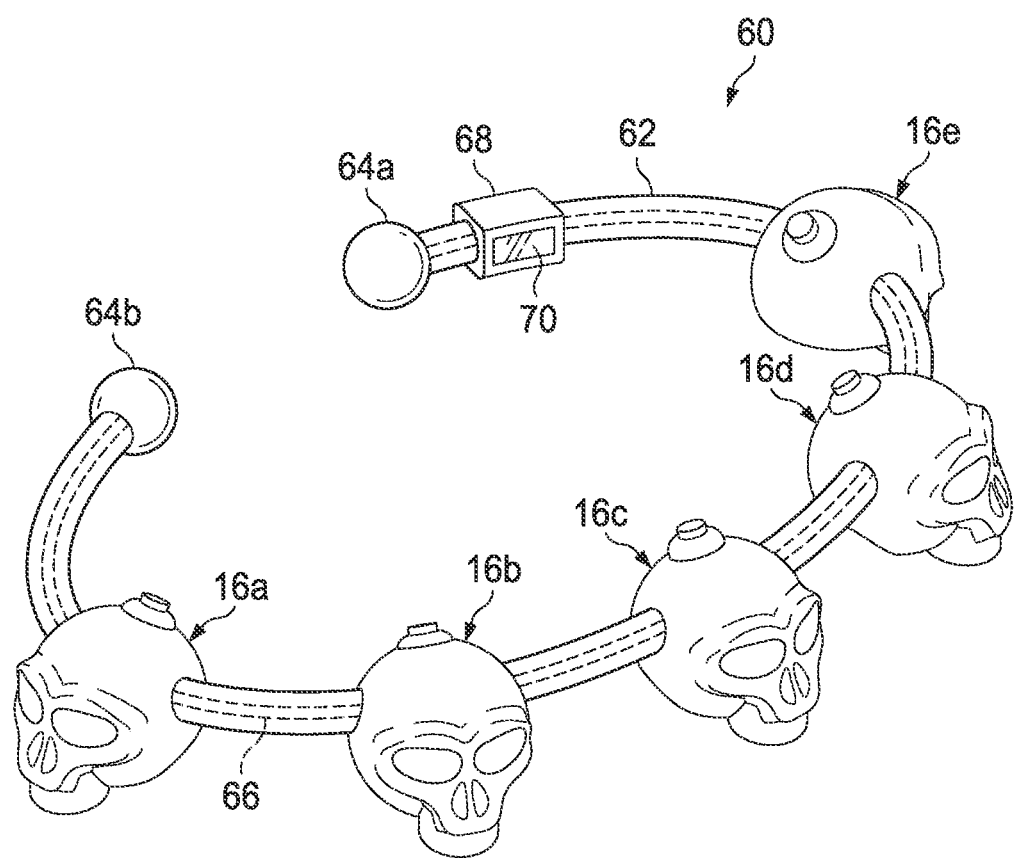
FIG. 6 is a simplified orthographic view illustrating an interchangeable charm messaging wearable electronic device for wireless communication in accordance with another embodiment of the present disclosure.

FIG. 6 is a simplified orthographic view illustrating an interchangeable charm messaging wearable electronic device 60 for wireless communication in accordance with another embodiment of the present disclosure. Wearable electronic device 60 can include a bracelet portion 62 having a first end 64a and a second end 64b configured to be worn around a wrist of a user, and charm devices 16a-16e configured to be attached to bracelet portion 62. In the particular embodiment illustrated in FIG. 6, bracelet portion 62 is constructed in a generally ring shaped form with an open portion between first end 64a and second end 64b to facilitate placing of wearable electronic device 60 upon a wrist of a user.

Bracelet portion 62 further includes one or more shape memory alloy (SMA) wires 66 disposed within bracelet portion 62 and an SMA wire controller 68 coupled to the SMA wire(s) 66. SMA wire controller 68 further includes a SMA touch control interface 70. SMAs, which are sometimes referred to muscle wire or smart metal, are alloys with austenitic/martensitic phase transition properties that can shape-shift from a deformed shape to a default shape upon application of an external stimulus, such as heat or current, to the SMA to 'reset' the SMA back to its default shape. An SMA is capable of being deformed by both bending and stretching actions. An SMA can hold a deformed shape until it is reset back to its default shape. SMAs can be manufactured in wire, rod or ribbon form. In various embodiments, SMAs can be formed of alloys, which can include, but not be limited to Nickel and Titanium; Copper, Aluminum and Nickel; Copper, Zinc and Aluminum alloys or other alloys which may contain Zinc, Copper, Gold or Iron.

A default shape can be 'set' for an SMA by annealing the SMA at high temperatures, for example, from 400° C.-500° C. for a predetermined period of time (as determined by thickness, length, etc.). Thereafter, once deformed, the SMA can re-shape itself back to the default shape through application of a current or heat (typically, at temperatures much less than the temperature needed to set the default shape) to the SMA.

As shown in FIG. 6, SMA wires 66 may be set to have a default curved shape, which may correspond to the closed configuration for wearable electronic device 60. In order to place wearable electronic device 60 upon a wrist of a user, the user may deform bracelet portion 62 by pulling first end portion 64a and second end portion 64b further apart, which will in turn deform SMA wire(s) 66. In one or more embodiments, the user may touch SMA touch control interface 70 and cause SMA wire controller to apply a current to SMA wire 66 from a current source (e.g., battery, capacitor, circuitry, etc.) in order to manipulate SMA wire(s) 66 from a deformed shape back to its default shape. For example, a current may be applied to SMA wire 66 to bring the first end 64a and second end 64b of bracelet portion 62 together to facilitate attaching wearable electronic device 60 to the user.

Although shown in a wire form, it should be understood that SMAs for use in wearable electronic device 60 may also be in rod or ribbon form and configured accordingly for bracelet portion 62. In one or more embodiments, the diameter of SMA wires 66 may be varied by a designer based on dimensions and materials chosen for wearable electronic device 60.

In accordance with various embodiments, bracelet portions may include magnetic stays disposed along an extent of bracelet portion 62, and each charm device 16a-16e may include magnetic material disposed within and/or upon a portion of the respective housing portions 20a-20e to allow the user to affix the particular charm device 16a-16e to a particular magnetic stay at a desired position along bracelet portion 62. Accordingly, a user may arrange charm devices 16a-16e in a desired order along bracelet portion 62. Further, in particular embodiments, charm devices 16a-16e may be configured to perform one or more messaging functions as further described herein with respect to FIGS. 1-5.

Figure 7:
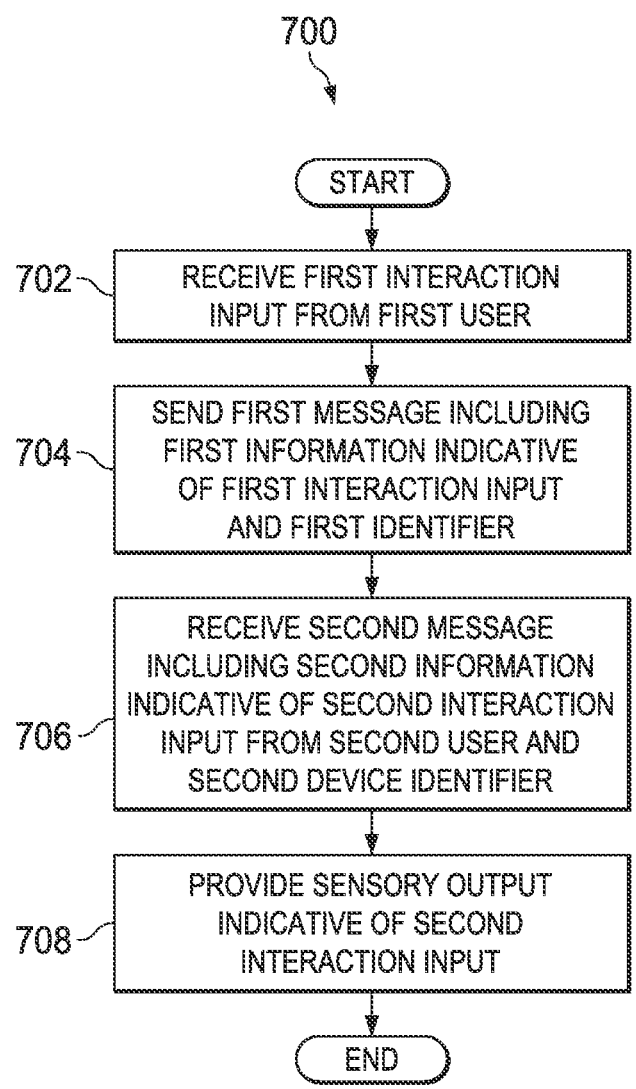
FIG. 7 is a simplified flow diagram illustrating potential operations for at least one charm device of the wearable electronic device in accordance with one embodiment of the present disclosure.

Referring now to FIG. 7, FIG. 7 is a simplified flow diagram 700 illustrating potential operations for at least one charm device 16a-16e of wearable electronic device 10 in accordance with one embodiment of the present disclosure. The operations may be used to communicate a first message indicative of a first interaction input by a first user to another wearable electronic device of a second user, receive a second message indicative of a second interaction input by the second user using the other wearable electronic device, and provide a sensory output to the first user indicative of the second interaction input.

In 702, a particular charm device affixed to bracelet portion of wearable electronic device receives a first interaction input from a first user associated with the wearable electronic device. In particular embodiments, the particular charm device includes a touch input device configured to receive the first interaction input. In 704, the particular charm device sends a first message to an electronic device associated with a second user. In one or more embodiments, the first message includes first information indicative of the first interaction input and a first device identifier associated with the at least one charm device. In one or more embodiments, the first device identifier is further associated with the second user. In particular embodiments, the association of the first device identifier with the second user is performed by the first user. In still other particular embodiments, the electronic device associated with the second user includes another wearable electronic device. In particular embodiments, the other wearable electronic device may include a bracelet portion having one or more charm devices attached to the bracelet portion.

In various embodiments, the electronic device associated with the second user is configured to provide a first sensory output indicative of the first interaction input to the second user. In particular embodiments, the first sensory output may include at least one of an illumination output, a vibration output, and an audio output.

In 706, the particular charm device receives a second message including second information indicative of a second interaction input provided to the electronic device associated with the second user, and a second device identifier associated with the electronic device associated with the second user. In various embodiments, the second device identifier is further associated with the first user. In 708, the particular charm devices provides a second sensory output indicative of the second interaction input from the second user. The operations then end. In at least one embodiment, the particular charm devices includes at least one sensory output device configured to provide the second sensory output. In particular embodiments, the at least one sensory output device includes at least one of an illumination device, a vibration device, and an audio output device.

In still other embodiments, the particular charm device may include a position sensor configured to detect a position of the at least one charm device along the bracelet portion. In various embodiments, the detected position of the at least one charm device along the bracelet portion determines a characteristic of the second sensory output. In particular embodiments, the bracelet portion includes at least one shape memory alloy (SMA) wire. In still other particular embodiments, the bracelet portion includes at least one magnetic stay configured to facilitate attachment of the at least one charm device to the bracelet portion.

Figure 8:
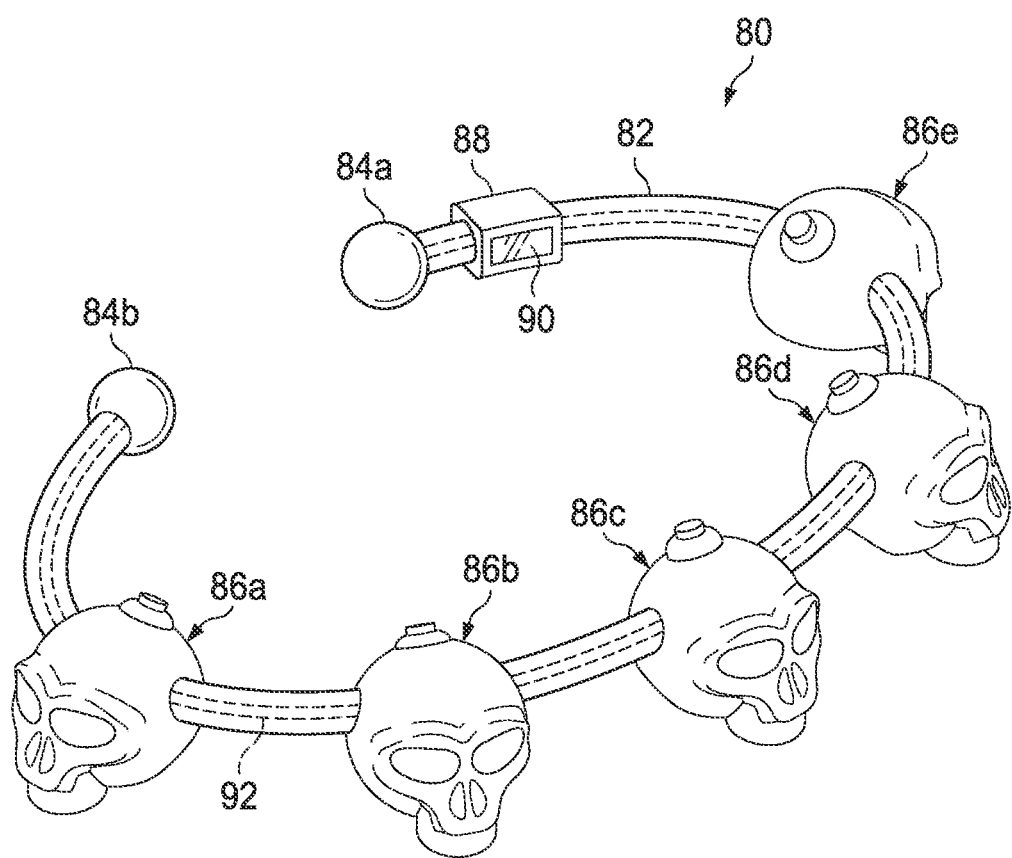
FIG. 8 is a simplified orthographic view illustrating an interchangeable charm messaging wearable electronic device for wireless communication in accordance with another embodiment of the present disclosure.

FIG. 8 is a simplified orthographic view illustrating an interchangeable charm messaging wearable electronic device 80 for wireless communication in accordance with another embodiment of the present disclosure. Wearable electronic device 80 can include a bracelet portion 82 having a first end 84*a* and a second end 84*b* configured to be worn around a wrist of a user, and charm devices 86*a*-86*e* configured to be attached to bracelet portion 82. In the particular embodiment illustrated in FIG. 8, bracelet control logic 88 attached to bracelet portion 82. Bracelet control logic 88 further includes touch control interface 90. Bracelet control logic 88 is in communication with each of first charm device 86*a*, second charm device 86*b*, third charm device 86*c*, fourth charm device 86*d*, and fifth charm device 86*e* via a communication bus 92. In at least one embodiment, charm devices 86*a*-86*e* may be in communication with communication bus 92 via direct contact with one or more magnetic stays of bracelet portion 12. In accordance with various embodiments of wearable electronic device 80, the messaging logic and wireless communication circuitry of wearable electronic device 80 may be contained within bracelet control logic 88 rather than in each of charm devices 86*a*-86*e* as previously described herein.

In the embodiment illustrated in FIG. 8, each of charm devices 86*a*-86*e* may include one or more touch input devices such as touch input device 18*a*, and one or more sensory output devices such as illumination device(s) 22*a*, vibration device 438, and audio output device 440. In one or more embodiments, bracelet control logic 88 includes logic configured to receive touch inputs from each of charm devices 86*a*-86*e* via communication bus 92 and cause one or more of charm devices 86*a*-86*e* to produce one or more sensory outputs in response to an interaction by a user with one or more of charm devices 86*a*-86*e* and/or in response to an interaction by another user with charm devices of another wearable electronic device. Bracelet control logic 88 may further include wireless communication circuitry such as wireless communication module 414 to facilitate communication with another wearable electronic device or other electronic communication device. In particular embodiments, each of charm devices 86*a*-86*e* may use a localized passive radio interface such as RFID elements or direct contact through magnetic stay locations to provide bracelet control logic 88 with information indicative of a particular location of a particular charm device 86*a*-86*e* along bracelet portion 82. Bracelet control logic 88 may use wireless communication circuitry to communicate with other electronic communication devices such as first electronic communication device 502*a* or another wearable electronic device based upon the location of one or more of charm devices 86*a*-86*e*.

In one or more embodiments, bracelet control logic 88 may be configured to determine a type and specific stay location of each charm device 86*a*-86*e*, determine a charm interaction and/or interaction result of the charm type/placement. The determination by bracelet control logic 88 may include reading the charm type and/or per stay location via a physical interface, RFID interface, or other localized passive or active radio interface. Once gathered, this information may be sent to a server such as server 506, an electronic communication device such as electronic communication device 502*a*, and/or directly to another wearable communication device. In the same or a similar regard, the server, electronic communication device, or other wearable communication device may send corresponding information associated with one or more other wearable communication devices to wearable communication device 80. Bracelet control logic 88 may then be configured to perform certain actions, such as cause one or more of charm devices 86*a*-86*e*, to provide specific sensory outputs, based on the combination of received information from the one or more other wearable electronic devices and the charm type and/or location information of wearable electronic device 80.

In accordance with some embodiments, wearable electronic device 80 may operate in the same or a similar manner as that described with respect to the wearable electronic device embodiments described herein with respect to FIGS. 1-7.

The example means and method described above are only a few of the many means and methods that may be used to communicate using wearable communication devices 10, 60, and 80. Virtually any other means could be used, and, thus are clearly within the scope of the present disclosure.

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include one or more non-transitory, tangible, machine readable media having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "non-transitory machine readable medium" shall accordingly include, but not be limited to, memories* such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It is imperative to note that all of the specifications, dimensions, and relationships outlined herein (e.g., width, length, thickness, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

The following examples pertain to embodiments in accordance with this Specification. Note that all optional features of the apparatuses and systems described above may also be implemented with respect to the method or process described herein and specifics in the examples may be used anywhere in one or more embodiments.

Example 1 is a wearable electronic device, comprising: a bracelet portion; and at least one charm device configured to be affixed to the bracelet portion, the at least one charm device including logic configured to: receive a first interaction input; and send a first message including a first information indicative of the first interaction input and a first identifier associated with the at least one charm device to a second wearable electronic device, the first identifier being further associated at least a portion of the second wearable electronic device.

In Example 2, the subject matter of Example 1 can optionally include a touch input device configured to receive the first interaction input.

In Example 3, the subject matter of any of Examples 1-2 can optionally include wherein the second wearable electronic device is configured to provide a first sensory output indicative of the first interaction input.

In Example 4, the subject matter of Examples 3 can optionally include wherein the first sensory output includes at least one of an illumination output, a vibration output, and an audio output.

In Example 5, the subject matter of any of Examples 1-4 can optionally include, wherein the at least one charm device is associated with a user.

In Example 6, the subject matter of any of Examples 1-5 can optionally include wherein the logic is further configured to: receive a second message including a second information indicative of a second interaction input provided to at least a portion of the second wearable electronic device, and a second identifier associated with the second wearable electronic device.

In Example 7, the subject matter of any of Examples 1-6 can optionally include at least one sensory output device, wherein the at least one sensory output device is configured to provide a second sensory output indicative of the second interaction input.

In Example 8, the subject matter of Example 7 can optionally include wherein the at least one sensory output device includes at least one of an illumination device, a vibration device, and an audio output device.

In Example 9, the subject matter of any of Examples 1-7 can optionally include wherein the at least one charm device includes a position sensor configured to detect a position of the at least one charm device along the bracelet portion.

In Example 10, the subject matter of any of Examples 1-9 can optionally include wherein the detected position of the at least one charm device along the bracelet portion determines a characteristic of the second sensory output.

In Example 11, the subject matter of any of Examples 1-10 can optionally include wherein the bracelet portion includes at least one shape memory alloy (SMA) wire.

In Example 12, the subject matter of any of Examples 1-11 can optionally include wherein the bracelet portion includes at least one magnetic stay configured to facilitate attachment of the at least one charm device to the bracelet portion.

In Example 13, the subject matter of any of Examples 1-12 can optionally include wherein at least a portion of the logic is partially implemented in hardware.

In Example 14, the subject matter of any of Examples 1-13, wherein the logic further comprises: at least one processor; and at least one memory.

Example 15 is at least one computer readable storage medium comprising instructions, wherein the instructions when executed by at least one processor cause the at least one processor to receive, by at least one charm device configured to be affixed to a bracelet portion of a wearable electronic device, a first interaction input; and send, by the at least one charm device, a first message including a first information indicative of the first interaction input and a first identifier associated with the at least one charm device to a second wearable electronic device, the first identifier being further associated with at least a portion of the second wearable electronic device.

In Example 16, the subject matter of Example 15 can optionally include wherein the instructions, when executed by the at least one processor, further cause the at least one processor to: receive, by the at least one charm device, a second message including a second information indicative of a second interaction input provided to the second wearable electronic device, and a second identifier associated with the second wearable electronic device.

In Example 17, the subject matter of any of Examples 15-16 can optionally include wherein the instructions, when executed by the at least one processor, further cause the at least one processor to provide, by the at least one charm device, a second sensory output indicative of the second interaction input.

In Example 18, the subject matter of any of Examples 15-16 can optionally include wherein the instructions, when executed by the at least one processor, further cause the at least one processor to detect a position of the at least one charm device along the bracelet portion, wherein the detected position of the at least one charm device along the bracelet portion determines a characteristic of the second sensory output.

In Example 19, the subject matter of any of Examples 15-18 can optionally include wherein the at least one charm device is associated with a user.

Example 20 is a wearable electronic device, comprising: a bracelet portion; at least one charm device configured to be affixed to the bracelet portion; and control logic, the control logic configured to: receive a first interaction input to the at least one charm device; and send a first message including a first information indicative of the first interaction input and a first identifier associated with the at least one charm device to a second wearable electronic device, the first identifier being further associated with at least a portion of the second wearable device.

In Example 21, the subject matter of Example 20 can optionally include wherein the at least one charm further includes a touch input device configured to receive the first interaction input.

In Example 22, the subject matter of any of Examples 20-21 can optionally include wherein the second wearable electronic device is configured to provide a first sensory output indicative of the first interaction input.

In Example 23, the subject matter of any of Examples 20-22 can optionally include wherein the control is further configured to receive a second message including second information indicative of a second interaction input provided to the electronic device associated with the second user, and a second identifier associated with the second wearable electronic device.

In Example 24, the subject matter of any of Examples 20-23 can optionally include wherein the at least one charm device includes at least one sensory output device, wherein the at least one sensory output device is configured to provide a second sensory output indicative of the second interaction input.

In Example 25, the subject matter of any of Examples 20-24 can optionally include wherein the at least one sensory output device includes at least one of an illumination device, a vibration device, and an audio output device.

In Example 26, the subject matter of any of Examples 20-25 can optionally include wherein the control logic is further configured to detect a position of the at least one charm device along the bracelet portion.

In Example 27, the subject matter of any of Examples 20-26 can optionally include wherein the detected position of the at least one charm device along the bracelet portion determines a characteristic of the second sensory output.

In Example 28, the subject matter of any of Examples 20-28 can optionally include wherein the at least one charm device is associated with a user.

Example 29 is a method comprising: receiving, by at least one charm device configured to be affixed to a bracelet portion of a wearable electronic device, a first interaction input; and sending, by the at least one charm device, a first message including a first information indicative of the first interaction input and a first identifier associated with the at least one charm device to a second wearable electronic device, the first identifier being further associated with at least a portion of the second wearable electronic device.

In Example, 30, the subject matter of Example 30 can optionally include receiving, by the at least one charm device, a second message including a second information indicative of a second interaction input provided to the second wearable electronic device, and a second identifier associated with the second wearable electronic device.

In Example 31, the subject matter of any of Examples 29-30 can optionally include providing, by the at least one charm device, a second sensory output indicative of the second interaction input.

In Example 32, the subject matter of any of Examples 29-31 can optionally include detecting a position of the at least one charm device along the bracelet portion, wherein the detected position of the at least one charm device along the bracelet portion determines a characteristic of the second sensory output.

In Example 33, the subject matter of any of Examples 29-32 can optionally include wherein the at least one charm device is associated with a user.

Example 34 is an apparatus means for performing the method of any one of Examples 29-33.

In Example 35, the subject matter of Example 34 can optionally include wherein the means for performing the method comprise a processor and a memory.

In Example 36, the subject matter of Example 35 can optionally include wherein the memory comprises machine readable instructions, that when executed cause the apparatus to perform the method of any one of Examples 29-33.

In Example 37, the subject matter of any of Examples 34-37 can optionally include wherein the apparatus is a computing system.

Example 38 is at least one computer readable medium comprising instructions that, when executed, implement a method or realize an apparatus as described in any one of Examples 1-14 or 29-37.

Example 39 is an apparatus comprising: means for receiving, by at least one charm device configured to be affixed to a bracelet portion of a wearable electronic device, a first interaction input; and means for sending, by the at least one charm device, a first message including a first information indicative of the first interaction input and a first identifier associated with the at least one charm device to a second wearable electronic device, the first identifier being further associated with at least a portion of the second wearable electronic device.

In Example 40, the subject matter of Example 39 can optionally include means for receiving, by the at least one charm device, a second message including a second information indicative of a second interaction input provided to the second wearable electronic device, and a second identifier associated with the second wearable electronic device.

In Example 41, the subject matter of any of Examples 39-40 can optionally include means for providing, by the at least one charm device, a second sensory output indicative of the second interaction input.

In Example 42, the subject matter of any of Examples 39-41 can optionally include means for detecting a position of the at least one charm device along the bracelet portion, wherein the detected position of the at least one charm device along the bracelet portion determines a characteristic of the second sensory output.

In Example 43, the subject matter of any of Examples 39-42 can optionally include wherein the at least one charm device is associated with a user.

What is claimed is:

1. A wearable electronic device, comprising:
a bracelet portion; and
at least one first charm device configured to be affixed to the bracelet portion, the at least one first charm device including logic configured to:
receive a first interaction input;
send a first message including a first information indicative of the first interaction input and a first identifier identifying the at least one first charm device from among a first plurality of charm devices of the wearable electronic device to a second wearable electronic device, the first identifier being further associated with at least one second charm device of the second wearable electronic device from among a second plurality of charm devices of the second wearable electronic device, wherein the at least one second charm device of the second wearable electronic device is configured to provide a first sensory output indicative of the first interaction input;
receive a second message including a second information indicative of a second interaction input provided to the at least one second charm device of the second wearable electronic device; and
provide a second sensory output indicative of the second interaction input, wherein the at least one first charm device includes a position sensor configured to detect a position of the at least one first charm device along the bracelet portion, and wherein the detected position of the at least one first charm device along the bracelet portion determines a characteristic of the second sensory output.

2. The wearable electronic device of claim 1, further comprising a touch input device configured to receive the first interaction input.

3. The wearable electronic device of claim 1, wherein the first sensory output further includes at least one of an illumination output, a vibration output, and an audio output.

4. The wearable electronic device of claim 1, wherein the at least one first charm device is associated with a user.

5. The wearable electronic device of claim 1, wherein the second message further includes a second identifier associated with the second wearable electronic device.

6. The wearable electronic device of claim 5, further including at least one sensory output device, wherein the at least one sensory output device is configured to provide the second sensory output indicative of the second interaction input.

7. The wearable electronic device of claim 6, wherein the at least one sensory output device further includes at least one of an illumination device, a vibration device, and an audio output device.

8. The wearable electronic device of claim 1, wherein the bracelet portion includes at least one shape memory alloy (SMA) wire.

9. The wearable electronic device of claim 1, wherein the bracelet portion includes at least one magnetic stay configured to facilitate attachment of the at least one first charm device to the bracelet portion.

10. The wearable electronic device of claim 1, wherein at least a portion of the logic is partially implemented in hardware.

11. The wearable electronic device of claim 1, wherein the logic further comprises:
at least one processor; and
at least one memory.

12. At least one non-transitory computer readable storage medium comprising instructions, wherein the instructions when executed by at least one processor cause the at least one processor to:
receive, by at least one first charm device configured to be affixed to a bracelet portion of a first wearable electronic device, a first interaction input;
send, by the at least one first charm device, a first message including a first information indicative of the first interaction input and a first identifier identifying the at least one first charm device from among a first plurality of charm devices of the first wearable electronic device to a second wearable electronic device, the first identifier being further associated with at least one second charm device of the second wearable electronic device from among a second plurality of charm devices of the second wearable electronic device, wherein the at least one second charm device of the second wearable electronic device is configured to provide a first sensory output indicative of the first interaction input;

receive, by the at least one first charm device, a second message including a second information indicative of a second interaction input provided to the at least one second charm device of the second wearable electronic device; and provide, by the at least one first charm device, a second sensory output indicative of the second interaction input, wherein the at least one first charm device includes a position sensor configured to detect a position of the at least one first charm device along the bracelet portion, and wherein the detected position of the at least one first charm device along the bracelet portion determines a characteristic of the second sensory output.

13. The medium of claim 12, wherein the second message further includes a second identifier associated with the second wearable electronic device.

14. The medium of claim 12, wherein the at least one first charm device is associated with a user.

15. A wearable electronic device, comprising:

a bracelet portion;

at least one first charm device configured to be affixed to the bracelet portion; and control logic, the control logic configured to:

receive a first interaction input to the at least one first charm device; send, by the at least one first charm device, a first message including a first information indicative of the first interaction input and a first identifier identifying the at least one first charm device from among a first plurality of charm devices of the wearable electronic device to a second wearable electronic device, the first identifier being further associated with at least one second charm device of the second wearable electronic device from among a second plurality of charm devices of the second wearable electronic device, wherein the at least one second charm device of the second wearable electronic device is configured to provide a first sensory output indicative of the first interaction input;

receive by the at least one first charm device a second message including a second information indicative of a second interaction input provided to the at least one second charm device of the second wearable electronic device; and provide, by the at least one first charm device, a second sensory output indicative of the second interaction input, wherein the at least one first charm device includes a position sensor configured to detect a position of the at least one first charm device along the bracelet portion, and wherein the detected position of the at least one first charm device along the bracelet portion determines a characteristic of the second sensory output.

16. The wearable electronic device of claim 15, wherein the at least one first charm device further includes a touch input device configured to receive the first interaction input.

17. The wearable electronic device of claim 15, wherein the second message further includes a second identifier associated with the second wearable electronic device.

18. The wearable electronic device of claim 17, wherein the at least one first charm device further includes at least one sensory output device, wherein the at least one sensory output device is configured to provide the second sensory output indicative of the second interaction input.

19. The wearable electronic device of claim 18, wherein the at least one sensory output device further includes at least one of an illumination device, a vibration device, and an audio output device.

20. The wearable electronic device of claim 15, wherein the at least one first charm device is associated with a user.

* * * * *